Oct. 29, 1957     E. J. BUCHANAN     2,810,956
POWER OPERATED CUTTING TOOL
Filed Feb. 14, 1955     2 Sheets-Sheet 1
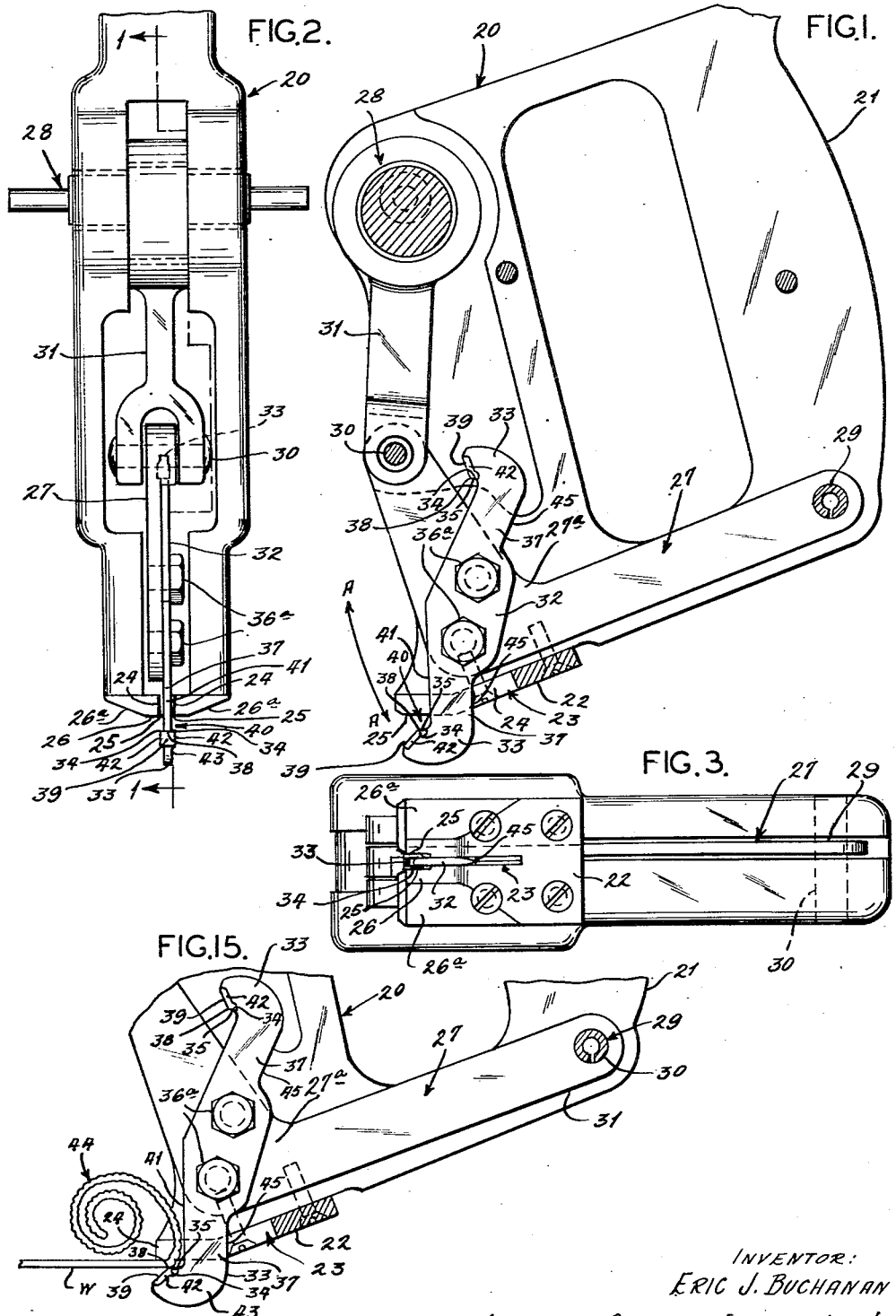
INVENTOR:
ERIC J. BUCHANAN
By Gravely Lieder Woodruff & Wills
ATTORNEYS.

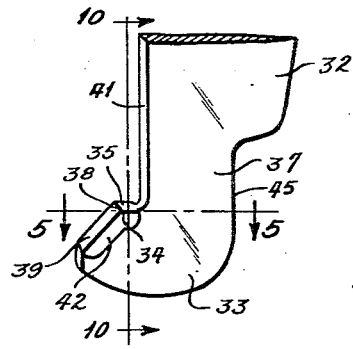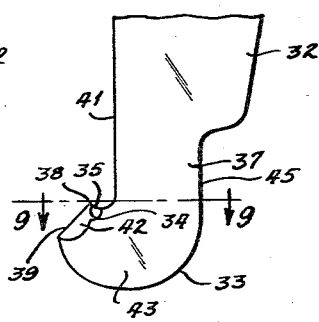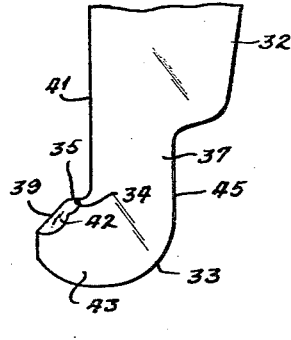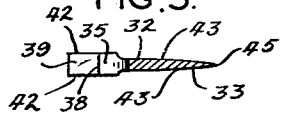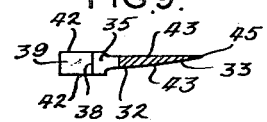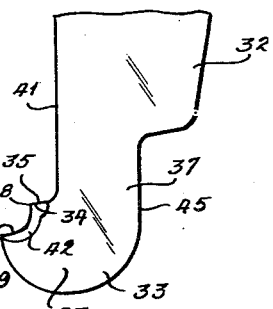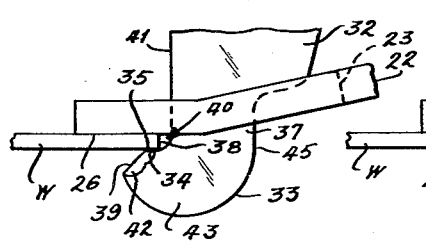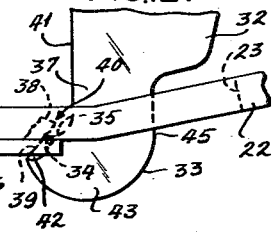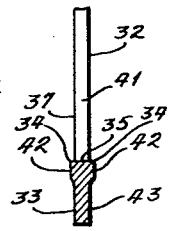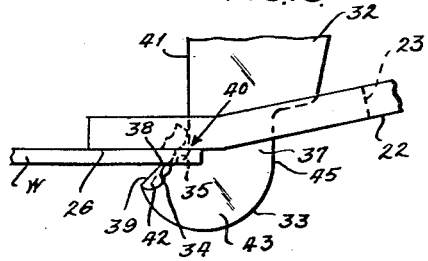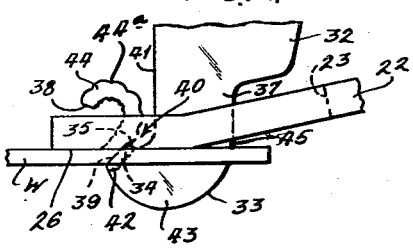

United States Patent Office 2,810,956
Patented Oct. 29, 1957

2,810,956

POWER OPERATED CUTTING TOOL

Eric J. Buchanan, Glendale, Mo.

Application February 14, 1955, Serial No. 487,775

7 Claims. (Cl. 30—247)

This invention relates to power operated cutting tools in general and particularly to those for cutting sheet material, such as metal. More particularly this invention relates to portable power operated cutting tools that can be operated while being manually gripped by the operator or while secured to a support.

Prior power operated cutting tools have used either a double or a single edged scissor action or a nibbling action. The scissor action tool is limited as to thickness of material it can cut, particularly with respect to metal, and as to the curvature of the cutting path because of the relatively large portion of the cutting cycle during which the cutting edges are engaged with the work. The sharpness of the curvative of a cut is limited also because the movable cutting member must be so dimensioned as to accommodate the strain while cutting.

The nibbling action type tool also has disadvantages. The cut is accomplished by removing successive chips or segments of the work, each of which requires full engagement of the cooperating cutting edges. If the pieces are punched out below the work, there has to be a rigid die member below the work. Such a die member must be carried by the tool itself and provide means for stripping the work from the cutting member. The die is carried by a leg fastened to the tool and supported thereby. Such a leg must be strong yet narrow to permit the work to pass around it. To achieve both of these objectives the leg must be thick along the direction of the cut, thereby limiting the sharpness of the curvature along which it will cut.

If the pieces are to be punched out above the work by the nibbler the movable member will have a tendency to stick in the work and cause the whole tool to bounce up and down. To prevent this bouncing, guards must be provided that extend through the work and around the movable cutting member. These guards also limit the radius of a cut.

The reciprocating cutting or shearing action used in this invention has the advantage of being able to make a narrow cut through thick material and at the same time follow a pattern outline including curves of small radii. Furthermore, the action is designed so that the tool is easily kept engaged with the work, and work which is not rigidly supported can be cut without undue vibration. In prior cutting tools the above combination of advantages do not exist. For instance, in the nibbler type tool, if the work and the tool are not very rigidly held, one or the other will vibrate and the cutting action will stop or become erratic. To prevent such undesirable effects it is the practice to provide a guard which extends around and underneath the movable cutting member, and up the front where it engages the work ahead of the cut. The forward part of the guard acts as a stripper and prevents the work and the tool from vibrating against each other.

One of the chief features of the present invention is found in the cutting action of the movable cutting member, and it can be understood why minimum strain is placed on the present movable cutting member when the cutting action of the tool is considered. The present tool has a single movable cutting member with a leg which extends through the cut in the work in substantially perpendicular relation to the work, and a stationary cutting member formed with an opening to receive the movable member. The leg is formed from rectangular section material providing strength with minimum size in the region where it passes through the work and in the cutting region. The movable cutting member is formed with a short shoulder directed at approximately a right angle to the leg. The space between said shoulder and the stationary cutting member receives the work to be cut. As the movable cutting member bites or hooks into the work it seats itself in an indentation formed by its engagement and pulls the part of the work so engaged between the edges of the opening in the stationary member. The edges of the stationary member are suitably spaced and related to the sides of the shoulder to operate in shear on the work confined therebetween. However, because there is no cooperating shearing edge to engage the forward or leading edge of the shoulder as there is along the sides, the work remains joined with the scrap strip at this relatively transverse location. As the movable cutting member continues to move into the work and relative to the stationary cutting member, the short piece of scrap strip which has been sheared on its sides is bent sharply in the area where it remains joined to the work. The movable cutting member is now ready to return to its extended position which is accomplished by the push of the operator and the sliding of the cutting member along the scrap strip in preparation to take another bite in the work. To aid in sliding the cutting member into position for each succeeding cut and to guide the work into the cutting area, the leading portion of the cutting member which lies forward of the shoulder is inclined to the stationary cutting member.

The desired angle of incline presents a compromise because the more nearly it approaches a right angle to the shoulder, the less of its surface will contact the work on the biting and pulling part of the stroke and the resulting short bite will produce less strain on the leg. However, a lesser incline of this leading surface in relation to the shoulder will more easily guide the work and tool into position for each succeeding stroke. The wedging action of the incline surface also acts as a stripper which requires no adjustment. An angle of about 55 degrees to the work is best for the combined function of stripping and guiding, and this angle also develops only a minimum strain. After the movable cutting member is again in position to engage the work it hooks into and bends another short segment of the scrap strip forward. The angle of the second bite relative to the work now is added to the angle of the first bite and, even though the length of the projecting shoulder is very short, the scrap strip will be bent ahead so that it will not interfere with the forward progress of the leg portion of the movable cutting member. The angle of bend of the scrap strip for each succeeding stroke will be added to each of the prior bends forming a curled scrap strip. The great advantage in my design lies in this short distance from the point of pressure where the shoulder meets the inclined surface to the forward edge surface of the leg. While the leg is being pulled straight up, the movable cutting member is under its greatest strain and this strain is minimized because of the short arm leverage that is exerted by having a short shoulder. For example, in cutting mild steel up to as heavy as 16 gauge, a shoulder 3/32" long is ample. Because the strain is reduced, the width of the leg can also be reduced and its sides can converge at the rear more abruptly to permit sharply curved patterns to be followed.

The continuous strip, formed on successive strokes of the movable cutting member, is guided away from the cutting region, eliminating the disadvantage of having to remove the cuttings or chips from this region. The tool made according to this invention will cut thicker work because of the relatively small engaging surface and because of the shape of the cutting edges adjacent the forward shoulder of the movable cutting member.

One of the principal objects of the present invention is to provide a portable power operated cutting tool of rugged yet simple construction that will cut heavy gauge sheet metal by indenting and seating of the movable member in the work and by a partial shearing action, thereby maintaining the cutting region free of obstructions by moving the work being cut away from the area of cutting.

It is an object of the present invention to provide a power operated cutting tool with cooperating stationary and movable cutting members, said members having cutting edges and divergent clearance surfaces which are formed so that there will be a minimum of superfluous surface contact between the cutting members and the material being cut.

It is an object of this invention to provide a power operated cutting tool arranged to reduce work strain and dangerous loads on the movable cutting member.

It is an object of this invention to provide a power operated cutting tool having a detachable moving cutting member that may be shaped to permit said cutting tool to cut along an arcuate path of small radius.

It is a further object to provide a tool arranged so that the movable cutting member is the only part which need be extended through the work and, consequently, may be removed from the work at any point, reinserted if further cutting is desired, or may be used to start a cut from a pilot hole.

A still further object of this invention is to provide a portable power operated cutting tool which may be used on flat stock or on sheet material other than flat stock and which requires no compensating adjustment for the thickness of the stock.

It is an object of this invention to provide a power operated cutting tool with dual means for attaching power so that the cutting tool may be controlled by the operator's right or left hand.

This invention is embodied in a cutting tool comprising a frame with handle means for gripping said frame and means for attaching a source of power, for example an electric drill tool having a suitable chuck device. The tool comprises a stationary cutting member carried on the frame having a cutting surface and a slot therein defined by cutting edges, and a movable cutting member having cutting means arranged to move in the slot and cooperate with the stationary cutting edges to produce a cutting action. A particular embodiment of the invention resides in the form and characteristics of the cutting means, such as an edged shoulder adjacent to the cutting edges of the movable cutting member and an inclined surface adjacent the shoulder to keep the tool engaged with the work.

This invention also consists in the parts and in the form and combination of parts hereinafter claimed and described in the accompanying drawings which form a part of this specification and wherein like numerals and symbols refer to like parts wherever they occur.

In the drawings:

Fig. 1 is a side elevational view partly in section taken along line 1—1 of Fig. 2 showing a preferred form of the tool embodying the present invention;

Fig. 2 is a front view of the device shown in Fig. 1 as seen from the left therein;

Fig. 3 is a bottom view of the device of Fig. 1;

Fig. 4 is a fragmentary perspective view of the preferred end of a typical movable cutting member;

Fig. 5 is a section view taken along line 5—5 in Fig. 4;

Fig. 6 is a fragmentary side elevational view of a modified form of the cutting member of Fig. 4;

Fig. 7 is a fragmentary side elevational view of a modification of the cutting member of Fig. 4;

Fig. 8 is a fragmentary side elevational view of a modification of Fig. 4;

Fig. 9 is a modification which may be applied to any of the cutting members, the view being taken along line 9—9 in Fig. 6;

Fig. 10 is a partly sectional elevational view showing the form of the movable cutting member in Fig. 4, the view being taken along line 10—10 therein;

Fig. 11 is a fragmentary side elevation of the cutting tool of Fig. 4 showing a flat piece of sheet material just before being engaged initially by the movable cutting member;

Fig. 12 is a view similar to Fig. 11 further showing the movable cutting member substantially at the top of its stroke;

Fig. 13 is a view similar to Fig. 11 as the movable cutting member is about to start another cutting stroke;

Fig. 14 is a view similar to Fig. 11 after many engagements between the movable cutting member and the material; and Fig. 15 is a fragmentary side elevational view of a modified tool assembly.

Referring to the drawings now in detail, Fig. 1 shows a sectional view of a power operated cutting tool with its frame 20 provided with a hand grip 21. Secured to the base of the frame 20 is a stationary cutting member 22 with a slot 23 having the spaced converging walls 24 terminating in and forming cutting edges 25 adjacent the lower cutting surface 26. The cutting surface 26 is shown in Fig. 2 having tapered sides 26a to add flexibility and facilitate cutting uneven surfaces. The frame 20 carries a member shown in Fig. 1 as a pivoted lever 27 which is angled to form an elbow 27a, and drive means 28 operatively connected to said movable member 27. The movable member 27 is pivoted at 29 to the frame 20 and is connected by a suitable pivot 30 to the eccentric type operating arm or element 31 of the drive means 28. Detachably connected to the elbow 27a of the movable member 27 by fastening means shown as bolts 36a is a double ended cutting member 32 having identical or modified opposite ends 33 formed to provide cutting edges 34 adjacent a forwardly facing, short length shoulder 35. The movable cutting member 32 is operatively located by said movable member 27 so that it moves on a short segment of an arc A—A about the pivot 29 within the desired range of slot 23 of the stationary cutting member 22.

Fig. 4 shows a fragmentary perspective view of the end 33 of the movable cutting member 32 having the forward shoulder 35 extending forward of a leg 37 of the movable cutting member 32 in the direction of the cut. The distance that the shoulder 35 will extend from the leg 37 will depend on the type and thickness of the material to be cut. The shoulder 35 is shown in Fig. 4 as having an edge 38 which edge separates the shoulder 35 from a forward, inclined surface 39. The angle that the inclined surface 39 makes with the work (see Fig. 11) may be varied for different types of material. The angle is shown in Fig. 1 at about 55° which is a desirable angle for the average gauge auto body sheet steel. However, this angle may vary from about 30° to about 80°. A less steep angle would more readily guide work that has irregular surfaces into a cutting region 40 defined between the shoulder 35 and the cutting surface 26. This surface 39 also acts to maintain the tool in cutting engagement with the work. However, as the angle is made less steep the engagement of the movable cutting member 32 with the work takes place at an undesirably greater distance from the forward edge 41 of the leg 37. The greater this distance becomes, the greater will be the strain on the end 33 of the movable member 32. The greatest strain normally occurs in the region of the crotch or angle between the shoulder 35 and the leg edge 41. A fillet in this angle aids in reducing high strain concentration. If the distance from the forward edge 41 of the leg 37 to the edge 38 is kept at a minimum the angle of the inclined surface 39 may be reduced or increased without appreciably jeopardizing the strength or cutting action of the movable member 32.

The end 33 of the movable cutting member 32 moves in the slot 23 in the stationary cutting or shearing member 22 and the movable cutting or shearing edges 34 cooperate with the stationary cutting or shearing edges 25. Said stationary edges 25 are so spaced in relation to the slot 23 that a clearance is provided between the stationary edges 25 and the movable edges 34. The movable edges 34 are formed on protruding surfaces 42 on the side faces 43 of the movable cutting member 32 so that the distance between the edges 34 will be greater than the normal thickness of the movable member 32. Widening the movable member 32 at the edges 34 provides a freer action between the movable member 32 and the work. The various edges described above are described both as cutting and shearing edges, because while they cut the material they accomplish this action in a shear-like manner.

In operation the tool moves toward the work W or the work W moves into the cutting region 40 as defined above. On the inward stroke (Fig. 11) of the movable cutting member 32, the shoulder 35 strikes the work and edge 38 (Fig. 12) seats itself therein. As the movable member 32 continues to move, the edges 34 cooperate with the stationary edges 25 in a shearing or cutting action, aided by the hooking tendency of edge 38. The segment of the work lying adjacent the shoulder 35 when seated is sheared along two lines defined by the cooperating edges and is pulled inwardly through the slot 23 in stationary member 22. The segments that have been sheared are sharply bent (Fig. 13) through the slot 23 and form a scrap strip as the tool advances. Because there is no shearing edge to cooperate with the edge 38, the sheared segments will remain in one continuous strip and will be joined to the work until the cut is completed by severing the work. The movable cutting member 32 normally moves far enough so that the unsheared leading end of the scrap strip is bent sharply out of the work by the action of the shoulder 35 in combination with the edge 38 that has seated itself in the work. In this regard the seating action of the shoulder 35 is very important. This action is powerful enough to keep the movable cutting member 32 engaged in the scrap strip even after the strip has been bent up at a considerable angle. The seating action overcomes in a large degree the natural tendency for the movable member 32 to want to slip out of the work. Examination of a scrap strip shows the numerous closely spaced indentations made by the edge 38, these being indicated in Fig. 14 at 44a.

Fig. 11 shows a piece of sheet material W being moved into position between the stationary cutting surface 26 and the shoulder 35 of the movable cutting member 32 in preparation for the first engagement therewith.

In Fig. 12, the shoulder 35 is shown seated in the work in the approximate fully retracted position of the movable members 32. It also clearly shows the manner in which the scrap strip is bent in sharp relation to the plane of the sheet material or work. The wedging action of the inclined surface 39 assists in stripping the movable cutting member 32 out of the work during that portion of the cycle when the movable cutting member 32 is being extended or forced downwardly. Furthermore this surface 39 guides the work into the cutting region 40 in preparation for the succeeding bite, and serves to urge the scrap strip into a more nearly upright position as the shoulder 35 shears and pulls the strip through the slot 23.

Fig. 13 shows the shoulder 35 about to engage the work a second time. The advantage of having bent the scrap strip sharply in relation to the work is now apparent because now the shoulder 35 is able to slide forward into position where the edge 38 can take another bite. In actual practice it is found that the shoulder 35 need only be about 3/32" long when cutting material such as steel up to about .060" in thickness because the bending action is so effective. The bending action is so pronounced that the work does not follow the contour of shoulder 35 except on the first stroke.

It is pointed out that the angular relation of the first segment of the scrap strip to the next segment remains the same or nearly so) with respect to the second and the second with the third, and so on. A curl 44 is formed of these connected segments, and the curl rolls ahead of the advancing cut. Fig. 14 shows the scrap strip after the tool has advanced some distance in the work. The action described is so effective in forcing the scrap strip removed from the work W away from the cutting region 40 that the forward shoulder 35 can be reduced in length and the leg 37 of the movable cutting member 32 can be tilted forward past the perpendicular if desired. This tilting removes pressure from the shoulder 35 and permits a still further reduction in the distance from the forward edge surface 41 to the rearward edge 45 of the leg of the movable cutting member 32. This reduced distance together with the modification to be described for Fig. 5 enables an operator to follow a sharply curved arcuate path.

In actual operation, the operator is required to apply forward pressure to the hand grip 21 of the tool. It is this pressure which advances the tool along the desired path and keeps the tool engaged in the work. However, it is one of the objects of the cutting action, as described, to reduce the pressure required by the operator to the point where the operator is aware only of a guiding and feeding action, as opposed to the feeling that brute force is needed to maintain cutting reaction.

Figs. 6, 7 and 8 show some of the many variations of the end 33 of the movable cutting member 32 that have been successfully used. In Fig. 6 the shoulder 35 is hollowed or formed to a radius to the rear of edge 38 and not flat as shown in Fig. 4. This gives a more positive seating action in the work of the edge 38. As the edge 38 wears down, a curved or rounded surface instead of the edge 38 will gradually take form; maintaining a comparatively good cutting edge and prolonging the useful life of the movable member 32. It is not essential that the edge 38 be sharp. It is not even necessary that an edge 38 be first to engage the work for a good cutting action. Even if the work engages movable member 32 behind the edge 38 first, it will shear the strip loose and bend it out of the way as described. However, as the edge 38 becomes rounded it may be necessary to increase the forward pressure on the hand grip 21 because of the greater tendency of the movable member 32 to slide out away from the direction of cutting, instead of seating itself in the work.

Fig. 7 shows a blade for making rapid cuts in relatively thin material. The region of edge 38 has been rounded into a curved surface and the work is first contacted by the movable member 32 to the rear of rounded edge 32. The principles of operation remain the same. The action will still be an indenting and seating of the shoulder 35 into the scrap strip with a shearing and pulling function, as above described.

Fig. 8 is another modification of the blade shown in Fig. 4 and is particularly useful over irregular surfaces. Here again the principle of operation is the same. The long forward projection has a greater tendency to keep the movable member 32 engaged with the work and prevents the tool from slipping out of the cut as it is guided in and out of concave and convex surfaces.

Many effects could be achieved by varying the forward contour or shape of the movable cutting member 32 in the region of the edge 38. However, the general principle of operation would be the same for each.

For all of the movable cutting members it is found desirable to have the movable cutting edges 34 protrude from the side faces 43 thereof to make the action freer. Fig. 10 illustrates a desirable shape for the protrusions 42.

Fig. 5 shows a cross section of the end 33 of a movable cutting member 32 taken along the line 5—5 in Fig. 4. This view shows the side faces 43 converging to the rearward edge 45. When so designed the operator is able to cut along an arcuate path directed either to the right or left of a straight path.

Fig. 9 shows another cross section of the end 33 of a movable cutting member 32, taken along the line 9—9 in Fig. 6, showing one side face 43 cut away and rounded to meet the other side face 43 at the rearward edge 45. This design permits cutting on a small radius arcuate path in one direction only, depending on which side face 43 is rounded off. However, the single rounded form has the advantage of added strength in the movable cutting member 32 where strength and the ability to cut arcuate paths are both important factors.

In Fig. 1, line A—A illustrates a segment of the circumference of a circle taken about the pivot 29 along which the cutting edges 34 of the movable cutting member 32 travel. Alternative arrangements employing straight line motion have been used successfully also. The arcuate motion, however, described above achieves very satisfactory results and offers many construction advantages.

In Fig. 2 is shown the leading end of the stationary cutting member 22. The work engaging surface 26 of the stationary cutting member 22 is shown having beveled surfaces 26a. The beveled surfaces 26a extend the length of the stationary member 22 that is in the plane of the work and permit the operator greater freedom when cutting sheet material that has an uneven surface.

Fig. 15 shows the end 33 of the movable cutting member engaging the work W at the beginning of a cutting stroke. The shoulder 35 and the forward edge 38 are just beginning to engage the work, and to draw another segment of the scrap strip 44 through the slot 23 in the stationary cutting member. Note that the movable cutting member moves upward and slightly forward to provide a good positive engagement with the work W. It is anticipated that the movable member could be mounted to have its forward edge 41 tilted past the perpendicular to form an acute angle with the work. Such a provision would enable the movable cutting member to even more readily remain engaged with the work.

Briefly, the advantages of the construction described above for a power operated cutting tool is in its simplicity of design, its ability to cut thick sheets of material, its ability to cut on uneven surfaces such as those that are concave or convex, its freedom from the use of adjustment means, its ability to utilize both ends of the moving cutting member, its minimum of resistance to the work being cut, and its ability to follow sharply defined arcuate paths.

What I claim is:

1. A power operated cutting tool comprising: a frame; cooperating stationary and movable cutting members; said stationary cutting member having a work engaging surface and a slot formed therein for operatively receiving said movable cutting member, said slot being formed with cutting edges; and drive means carried by said frame and operatively connected to said movable cutting member; said movable cutting member having a forward projecting portion including a forward work engaging edge, a work engaging shoulder extending rearwardly from said edge and spaced marginal cutting edges formed by opposite side faces of said member and said shoulder; said side faces being extended rearwardly from said forward shoulder in converging relation; said forward shoulder of said movable cutting member and said work engaging surface of said stationary cutting member defining a cutting region, wherein said movable forward shoulder and the forward work engaging edge thereof strike and hook into work moved into said cutting region forcing said movable cutting edges into cutting engagement with the work, said forward shoulder and the work engaging edge thereof of said movable cutting member pulling cut material through said slot in said stationary cutting member and away from the cutting region.

2. In a cutting tool for sheet material, a frame, driven means operatively mounted in said frame including a shaft adapted to be driven by a source of power, a movable cutting member carried by said driven means, and a stationary member fixed on said frame and having a slot therein to receive said movable cutting member; said movable cutting member including a leg, a shoulder directed forwardly from said leg, and a sheet engaging forward surface on said leg in advance of and angularly related with said shoulder to form an edge therewith for hooking into and thereby angularly displacing segments of the sheet material.

3. The cutting tool set forth in claim 2, wherein said driven means includes a pivoted arm movable reversely through a short stroke about a center whose radius is large relative to the length of the stroke, whereby said movable cutting member is caused to follow a nearly straight path and said shoulder maintains nearly the same angular relation with the stationary member.

4. The cutting tool set forth in claim 2, wherein said sheet engaging forward surface is long relative to the shoulder to enable the movable cutting member to remain engaged with the sheet material when cutting on uneven surfaces.

5. A power operated cutting tool comprising; a frame; cooperating stationary and movable cutting members; said stationary cutting member having a slot formed therein for operatively receiving said movable cutting member, said slot being formed with cutting edges presented to the work exposed by said slot for engagement by said movable cutting member; and drive means carried by said frame and operatively connected to said movable cutting member to move the same in successive strokes in said slot; said movable cutting member being formed with a work engaging shoulder having a forward work gripping edge, adjacent cutting edges and a work bending face in advance of said gripping edge, the successive strokes of said movable cutting member relative to said stationary cutting member effecting a progressive shearing and bending action upon the work exposed in said slot.

6. The power operated cutting tool set forth in claim 5 wherein the work engaging shoulder is angularly related with the work bending face.

7. A power operated cutting tool comprising a frame; a slotted stationary cutting member carried on the frame; and a cooperating movable cutting member, said movable cutting member having a leg portion positioned to extend through the slot in the stationary cutting member substantially perpendicular thereto and a forward projection on the leg portion adjacent to the extended end thereof, said forward projection having spaced cutting edges formed on thickened sections thereof, a forward shoulder between said spaced cutting edges for engaging said work opposite the stationary member, and side faces converging rearwardly from the forward shoulder to the trailing edge of said movable cutting member to form a rearward portion thereof narrower than the forward shoulder enabling the movable cutting member to cut along an arcuate path.

References Cited in the file of this patent

UNITED STATES PATENTS

| | | |
|---|---|---|
| 2,007,355 | Wallace | July 9, 1935 |
| 2,093,987 | Wallace | Sept. 21, 1937 |
| 2,273,376 | Reynolds | Feb. 17, 1942 |
| 2,348,876 | Beard | May 16, 1944 |